United States Patent [19]

Esashi

[11] Patent Number: 5,740,286
[45] Date of Patent: Apr. 14, 1998

[54] DIGITAL INFORMATION DECODING METHOD HAVING A RE-READING STEP

[75] Inventor: Masahiro Esashi, Nara, Japan

[73] Assignee: Sharp Kabushiki Kaisha, Osaka, Japan

[21] Appl. No.: 612,309

[22] Filed: Mar. 7, 1996

[30] Foreign Application Priority Data

Mar. 10, 1995 [JP] Japan .................. 7-051441

[51] Int. Cl.$^6$ .................................. G06K 9/00
[52] U.S. Cl. ........................... 382/312; 382/286
[58] Field of Search ........................ 382/233, 272, 382/270, 274, 275, 284, 287, 306, 308, 309, 312, 317, 318, 319, 321, 323, 324, 296, 286, 232, 235, 239, 251, 252, 254, 260, 276, 282, 291, 293, 298, 302, 307; 235/456, 462, 494, 495, 454; 358/486

[56] References Cited

U.S. PATENT DOCUMENTS

| | | | |
|---|---|---|---|
| 5,153,928 | 10/1992 | Iizuka | 382/65 |
| 5,410,620 | 4/1995 | Yoshida | 382/317 |
| 5,416,308 | 5/1995 | Hood et al. | 382/317 |
| 5,454,054 | 9/1995 | Iizuka | 382/321 |

FOREIGN PATENT DOCUMENTS

05314298 A  11/1993  Japan .................. G06K 7/10

*Primary Examiner*—Leo Boudreau
*Assistant Examiner*—Bijan Tadayon
*Attorney, Agent, or Firm*—David G. Conlin; Brian L. Michaelis

[57] ABSTRACT

Provided is a digital information decoding method capable of speedily and surely reading digital information recorded as a two-dimensional pattern by giving a mark to each of matrix meshes set virtually. The two-dimensional pattern is converted into image data composed of image bits. A center position of each mesh is calculated, and a value of the image bit in the calculated center position is read as a value of the mesh. If there is a read error, at least one of first through third analyzing methods is executed to perform re-reading. According to the first analyzing method, the position to be examined is shifted by a specified amount from the center position in the mesh. According to the second analyzing method, a sum of weighted values of the image bits included in the mesh is calculated and compared with a specified threshold value. According to the third analyzing method, based on a distance between a boundary of the mesh being examined and its calculated center position, the calculated center position of the adjacent mesh is corrected to coincide with a true center position of the adjacent mesh.

5 Claims, 9 Drawing Sheets

Fig.8A
Fig.8B
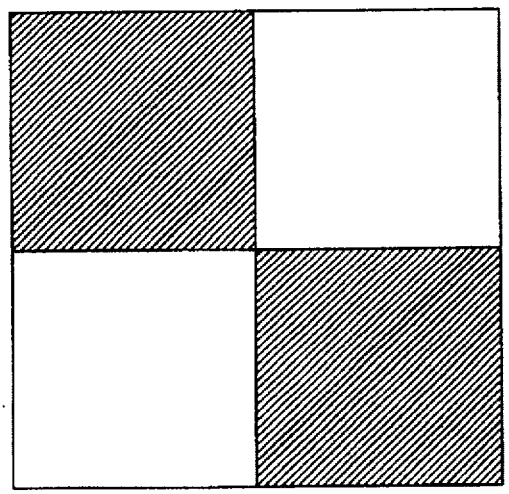
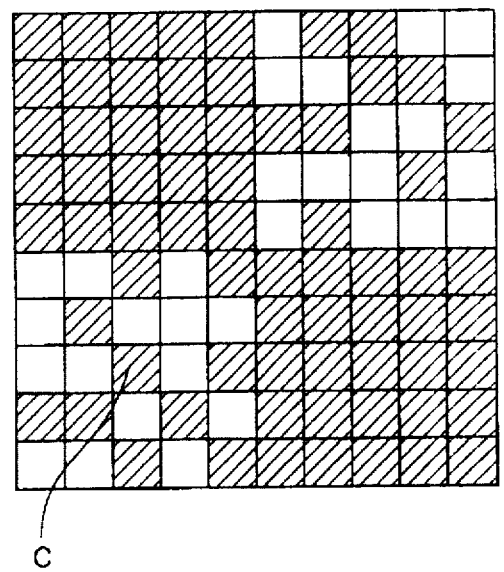
C
Fig.9A
| $r_1$ | $r_2$ | $r_3$ |
|---|---|---|
| $r_4$ | c | $r_5$ |
| $r_6$ | $r_7$ | $r_8$ |
Fig.9B
| 1 | 2 | 1 |
|---|---|---|
| 2 | 3 | 2 |
| 1 | 2 | 1 |

DIGITAL INFORMATION DECODING METHOD HAVING A RE-READING STEP

BACKGROUND OF THE INVENTION

1. Field of the Invention

The present invention relates to a digital information decoding method for decoding digital information recorded as a two-dimensional pattern on a recording carrier such as a paper sheet.

2. Description of the Prior Art

As a system for recording digital information on a surface of a recording medium such as a paper sheet, there has been disclosed a matrix code (e.g., data code devised by ID Matrix Corp. in U.S. and a vericode devised by Veritech Corp. in U.S.) capable of recording a greater amount of data at higher density in comparison with a bar code or the like. The matrix code expresses digital information recorded as a two-dimensional pattern by virtually setting matrix meshes corresponding to bits in an information recording area provided on a recording surface, and adding to the meshes optically recognizable marks such as white and black marks.

In reading such a matrix code, there has been generally put in practice a method of inputting a two-dimensional pattern as image data by scan with a CCD line sensor or a CCD camera and analyzing the whole image data for the reading. According to the above method, it is required to process a greater amount of image data in reading a matrix code than in reading a bar code, and this causes an increased processing time.

In contrast to the above, there has been recently proposed a decoding method of calculating a center position of each mesh based on positioning marks added to a matrix code and sampling only an image bit located in a calculated center position out of the image data (Japanese Patent Laid-Open Publication No. HEI 5-314298). According to the present decoding method, the information recorded in the information recording area can be read at high speed.

There is a possibility that a density nonuniformity attributed to input processing, distortion attributed to a mechanical error, and/or noise attributed to smear (those being collectively referred to as an "error" hereinafter) may occur in the inputted image data. However, the decoding method proposed in Japanese Patent Laid-Open Publication No. HEI 5-314298 samples only the image bit located in the calculated center position. Therefore, when image data has an error in a sampled portion, a read error may occur.

SUMMARY OF THE INVENTION

The object of the present invention is therefore to provide a digital information decoding method capable of executing reading at high speed and surely executing the reading even when an error is in image data.

In order to achieve the aforementioned object, the present invention provides a digital information decoding method for reading digital information from a recording carrier on which, by virtually setting matrix meshes corresponding to bits on a flat recording surface of the recording carrier and by giving an optically recognizable mark to each of the meshes, the digital information is recorded as a two-dimensional pattern together with a positioning mark for indicating position of each of the meshes and an error detection code for detecting a read error, comprising the steps of:

(a) converting the two-dimensional pattern recorded on the recording surface into image data composed of image bits having a density higher than a density of the meshes;

(b) calculating a center position of each of the meshes of the image data based on the positioning mark;

(c) examining only a value of an image bit located in the calculated center position in the image data;

(d) reading a value of the image bit examined at step (c) as a value of the mesh;

(e) deciding whether or not a read error is in the values of the read meshes by examining the error detection code; and (f) re-reading the values of the meshes by executing at least one of analyzing methods different from the method executed at steps (b) to (d), when a read error is in the value of the read meshes.

According to the digital information decoding method of the present invention, only the image bit located in the calculated center position of each mesh is read out of the image data in the initial reading process carried out at steps (b) to (d). Therefore, the reading is executed at a higher speed than in reading the whole image data. When a read error is in the values of the read meshes, at least one of the analyzing methods other than the original one is executed to re-read each of the meshes. With the above-mentioned operation, the image data is correctly read even when the image data contains abnormal data.

In one embodiment of the invention, information recording area of the recording carrier has a plurality of regions each of which is provided with the error detection code, and wherein steps (b) to (f) are executed for each region.

According to the above embodiment, of all regions of the information recording area, only a region in which a read error has occurred in the initial reading process is subjected to the re-reading process, while a region in which no read error has occurred in the initial reading process is not subjected to the re-reading process. Accordingly, the number of regions to be subjected to the re-reading process is limited when there is a local read error in the information recording area. Therefore, the processing time is prevented from increasing as a whole.

The analyzing methods include the following.

1) An analyzing method which comprises the steps of:
examining a value of an image bit located in a position shifted by a specified amount from the calculated center position within dimensions of the mesh; and
reading the value of the image bit as a value of the mesh.

According to this analyzing method, the reading is correctly executed even when the image data contains a local error in the calculated center position of a mesh.

2) An analyzing method which comprises the steps of:
calculating a sum of weighted values of a plurality of image bits included in each mesh;
comparing the sum with a specified threshold value; and
determining the value of the mesh based on a result of the comparison.

According to this analyzing method, the reading is correctly executed even when the density of the image data is excessively high or low.

3) An analyzing method which comprises the steps of:
recognizing a boundary of a mesh being examined;
correcting a calculated center position of a mesh adjacent to the mesh being examined based on a distance between the recognized boundary and the calculated center position of the mesh being examined such that the calculated center position of the adjacent mesh coincides with an actual center position thereof; and
reading a value of the image bit located in the corrected calculated center position as a value of the adjacent mesh.

According to this analyzing method, the reading is correctly executed even when the image data is distorted.

In the present invention, the processing time increases by the time of executing the re-reading. However, any of the above analyzing methods reads only the image bit located in a specified position of the image data. Therefore, in the re-reading process as well as the initial reading process the reading is executed more speedily than in the case where the whole image data is read. As a result, the reading is executed at high speed and surely.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8A is a view of an example of image data in which density nonuniformity is not included, and FIG. 8B is a view showing that density nonuniformity is included in the image data of FIG. 8A;

FIG. 9A is an explanatory view for showing an image bit in a center position surrounded by eight image bits, and FIG. 9B is a view for showing weights to be added to the image bits of FIG. 9A;

DETAILED DESCRIPTION OF THE PREFERRED EMBODIMENTS

The digital information decoding method of the present invention will be described in detail below based on embodiments thereof.

Figure 2:
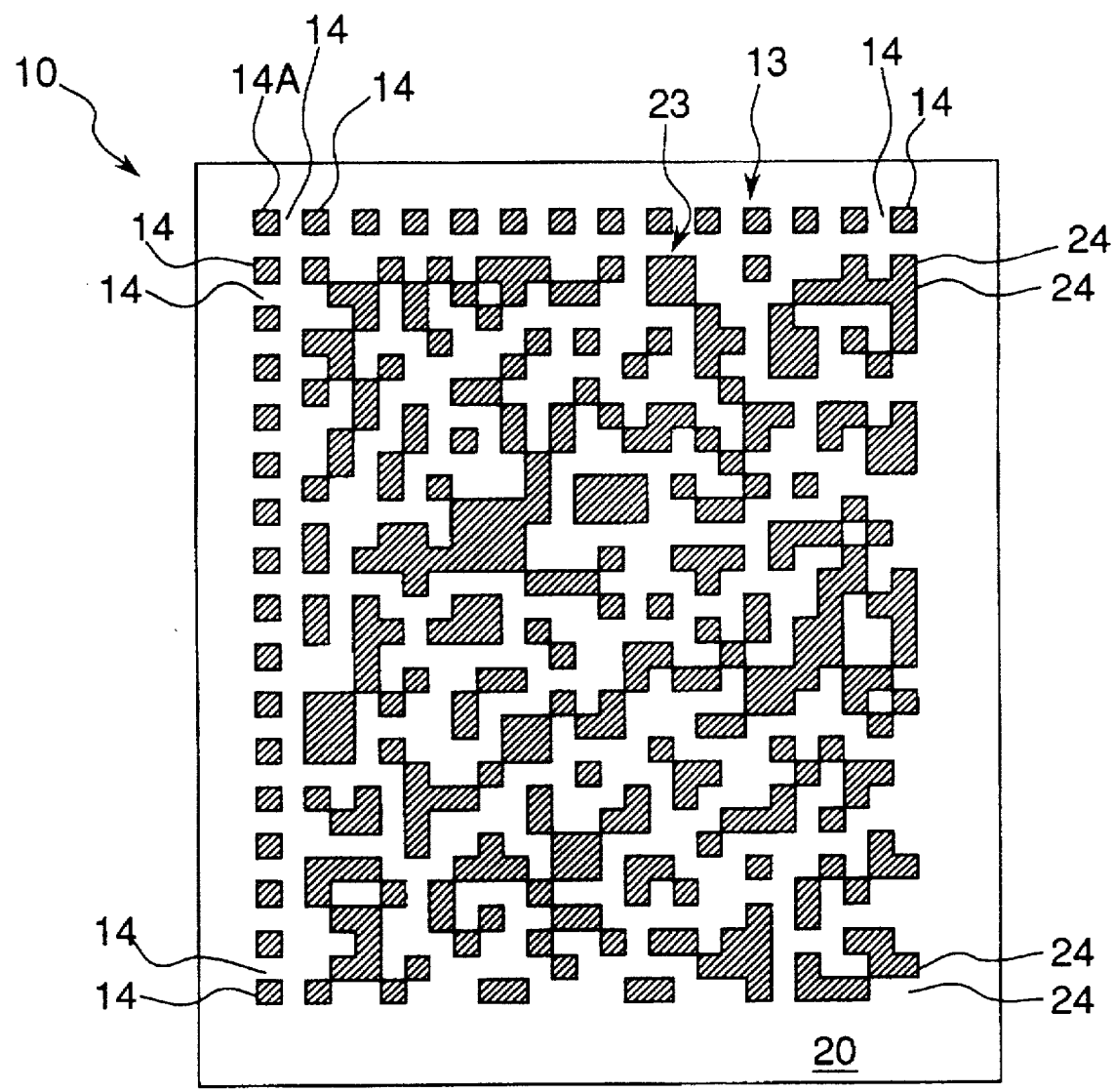
FIG. 2 is a diagram showing a recording carrier to be read.

FIG. 2 shows a recording carrier 10 to be read.

The recording carrier 10 has in its recording surface 20 such as a paper sheet a rectangular information recording area 23 which records therein digital information to be properly recorded, and an L-shaped synchronization area 13 provided along a left side and upper side of the information recording area 23.

In the information recording area 23, matrix meshes corresponding to bits are virtually set, and brightness (white and black) corresponding to the digital information to be recorded is given to each of the meshes, so that the digital information to be recorded is recorded as a two-dimensional pattern. In practice, the recording surface 20 is originally white, and only square black meshes are printed thereon with ink or the like. The digital information to be recorded is expressed by bit (binary digit), where each mesh corresponding to the bit of the binary number of 1 is expressed in white, while each mesh corresponding to the bit of the binary number of 0 is expressed in black. Assuming that a transverse position (column number) is m (m=1, 2, 3, ..., $M_C$) and a longitudinal position (row number) is n (n=1, 2, 3, ..., $M_L$), then a position Pc of a certain mesh is expressed by a combination of the two positions as:

Pc=(m, n)

It is to be noted that the maximum value $M_C$ of m is assumed to be a value obtained by subtracting one from the total number of columns in the transverse direction of the information recording area 23. The purpose for subtracting one from the total number of columns is to ensure an area 24 for an error detection code described later in the right end column of the information recording area 23. Assuming that a mesh $P_N$ corresponding to an Nth (N=1, 2, 3, ..., $M_C \times M_L$) bit of data expressed by a bit (binary digit) string is:

$P_N$=(res(N/$M_C$)+1, int(N/$M_C$)+1)

where res(N/$M_C$) is a residuum of the division of N/$M_C$ and int(N/$M_C$) is a quotient of the division of N/$M_C$ (integral part), then the bits and meshes correspond one to one, so that a two-dimensional pattern arranged with a priority given to the transverse direction is obtained. That is, FIG. 2 shows an example in which a bit string:

01101010001101001101101

10010101 ...

is recorded in the information recording area 23.

Digital information can be generally expressed by a binary number, and therefore this type of expression does not depend on the type of the data to be recorded. For instance, when data in a unit of byte (=8 bits) used generally in the field of computer is recorded, assuming that the value of each bit constituting the byte is bi (i represents the figure), then a value "a" of one byte is expressed as:

$$a = \sum_{i=0}^{7} (bi \times 2^i)$$

When the value of each byte is converted into a bit string of a sequence of from $b_7$ to $b_0$, the whole data is expressed by a bit string and is able to be recorded in the form of expression shown in FIG. 2.

In a mesh 24 at the right end of each row of the information recording area 23, a parity bit is arranged as an error detection code. The parity bit is set in the recording stage so that the number of bits of 1 (=white mesh) included in each row becomes an odd number, and that a read error can be detected in the reading stage by examining every row whether or not the number of bits of 1 is an odd number. The purpose for providing such a parity bit for each row is to detect a row in which an error takes place and limit the range to which a re-reading process as described later is applied so as to execute a high-speed re-reading process. In order to improve an error detection performance, a Reed-Solomon Code or the like used in the audio-use compact disc may be used instead of the parity bit.

The L-shaped synchronization area 13 is provided on the recording surface 20, separated apart from the information recording area 23 by the width of one mesh. In the synchronization area 13, there are provided synchronization cells 14, 14, . . . which serve as positioning marks for indicating the size of the information recording area 23 on the recording surface 20 and for representing the positions of the meshes. The synchronization cells 14 include cells each being composed of a black mesh having the same size as that of the meshes in the information recording area 23 (the cells each referred to as a "black cell" hereinafter) and cells each being composed of a white mesh having the same size as that of the meshes in the information recording area 23 (the cells each referred to as a "white cell" hereinafter). The black cells and white cells are arranged alternately in the synchronization area 13. The positions of the cells 14 correspond to the transverse positions (column number) and the longitudinal positions (row number) of the meshes in the information recording area 23. The black cell provided at the upper left corner plays an important role in the reading stage, and herein the black cell at the upper left corner is especially referred to as a reference cell 14A.

Figure 3:
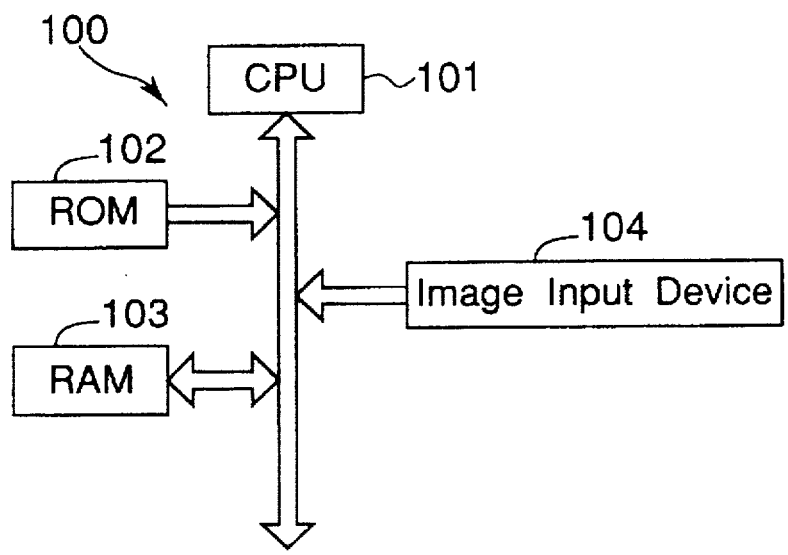
FIG. 3 is a diagram showing a construction of a reading apparatus for implementing the above digital information decoding method.

FIG. 3 shows a reading apparatus for implementing the reading method of an embodiment.

The reading apparatus 100 includes a CPU (Central Processing Unit) 101, a ROM (Read Only Memory) 102, a RAM (Random Access Memory) 103 and an image input device 104.

The CPU 101 controls the whole reading apparatus 100 by referring to a program stored in the ROM 102. The ROM 102 stores therein the program for operating the CPU 101. The RAM 103 temporarily stores image data outputted from the image input device 104 and data read by the CPU 101.

The image input device 104 scans the recording surface 20 and converts the recorded two-dimensional pattern in units of meshes into an image data arranged two-dimensionally in units of image bits (which are also called "dots"). The density of the image bits is higher than the density of the meshes in the recording surface 20, and one mesh corresponds to a plurality of image bits arranged in the transverse and longitudinal directions. It is sufficient for each image bit of the image data to be expressed by either of two values, i.e., 1 or 0 corresponding to a light or a dark. The image input device 104 is practically implemented by a CCD image pick-up device for use in a video camera or the like or an image scanner or the like employing a line sensor for use in a document reader of a facsimile.

Figure 1:
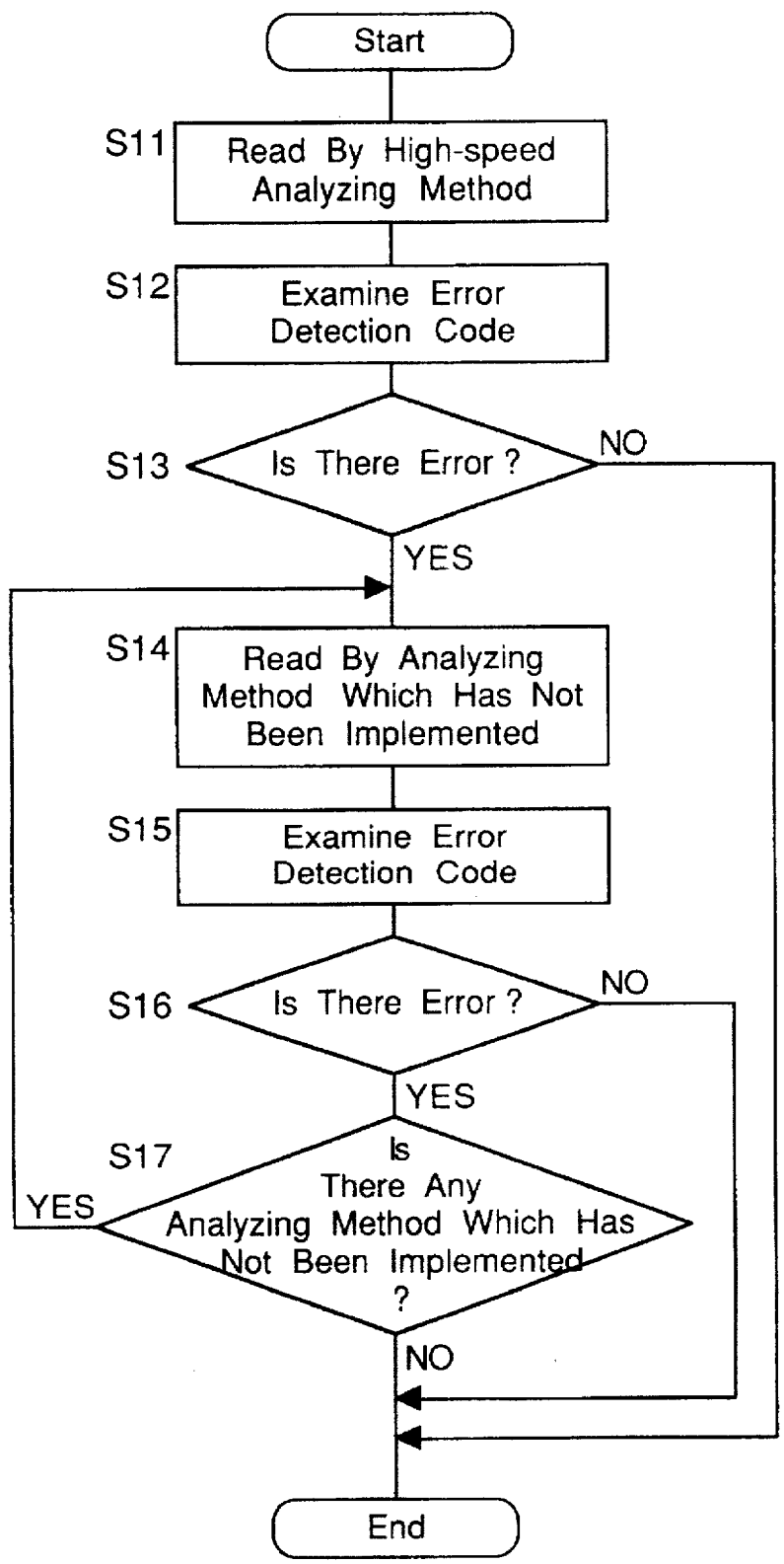
FIG. 1 is a flow chart showing a total flow of a digital information decoding method according to an embodiment of the present invention.

FIG. 1 shows a schematic flow of a digital information decoding method of one embodiment.

(1) As shown in FIG. 1, according to the present digital information decoding method, firstly digital information recorded in the information recording area 23 within the recording surface 20 is read by a high-speed analyzing method (S11).

Figure 4:
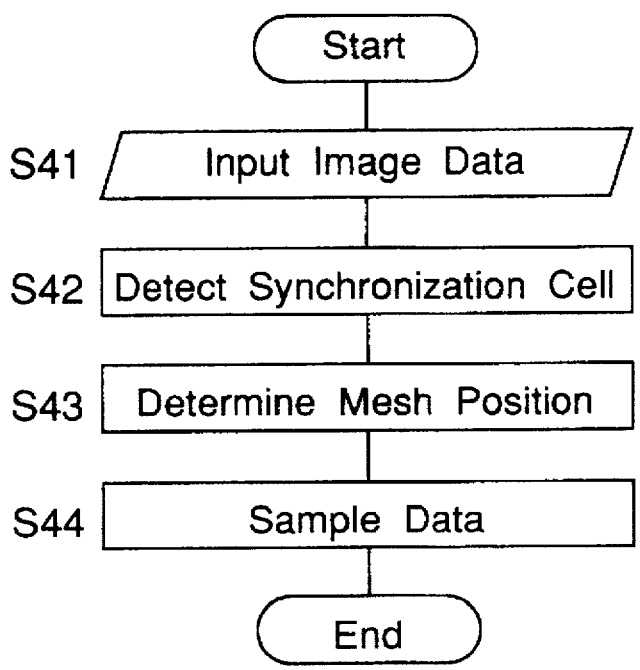
FIG. 4 is a flow chart showing a flow of an initial reading process of the above digital information decoding method.

The process of step S11 will be described with reference to a flow as shown in FIG. 4. First, image data is inputted by the image input device 104 (S41), and then synchronization cells 14 in the synchronization area 13 provided in the recording surface 20 are detected (S42). According to the information of the synchronization cells 14, the position of each mesh in the information recording area 23 is determined (S43). The value in the position of each determined mesh is sampled as data (S44). The feature of the reading method is to execute a re-reading process when a read error is detected in the sampling process at step S44. The processes of steps S41 through S44 will be described in detail below.

[1] First, at step S41 in FIG. 4, a recording surface 20 shown in FIG. 2 is read by the image input device 104 so as to obtain image data arranged two-dimensionally in units of image bits. That is, the values of the image bits, i.e., the minimum reading units of the image input device 104 are stored as image data two-dimensionally in correspondence with the positions of image bits into the RAM 103.

In the present example, assuming that the coordinate in the transverse direction of the image bit is x ($x=1, 2, \ldots, M_X$) and the coordinate in the longitudinal direction of the image bit is y ($y=1, 2, \ldots, M_Y$), then the image data arranged two-dimensionally is expressed as:

$$DI(x, y)$$

where $M_X$ represents the maximum image bit number in the transverse direction, $M_Y$ represents the maximum image bit number in the longitudinal direction. It is further assumed that an image bit representing white (referred to as a "white image bit" hereinafter) has a value of 1, and that an image bit corresponding to black (referred to as a "black image bit" hereinafter) has a value of 0. That is, it is assumed that:

$DI(x, y)=1$ (when the image bit at the coordinates (x, y) is a white image bit), and $DI(x, y)=0$ (when the image bit at the coordinates (x, y) is a black image bit).

Figure 5:
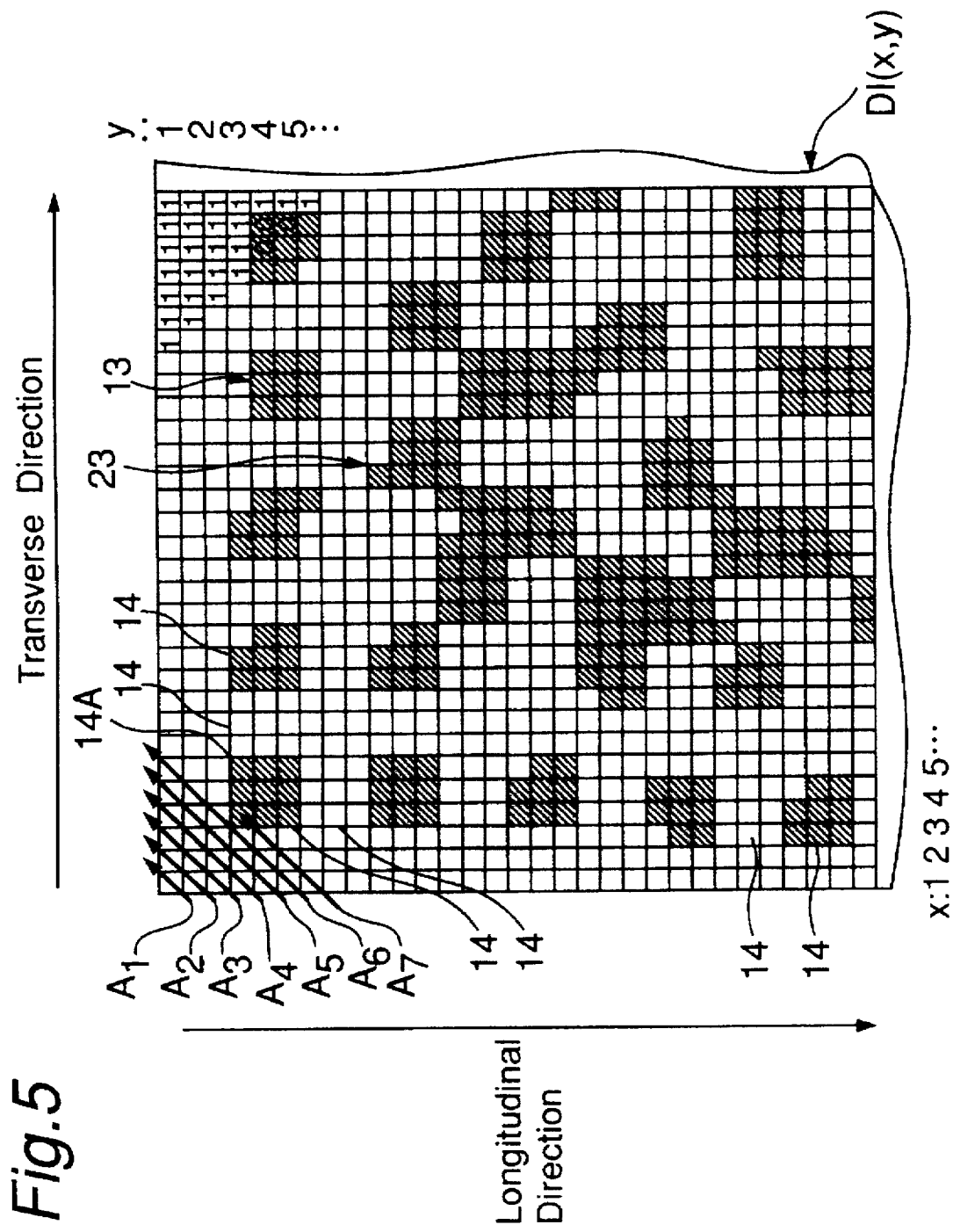
FIG. 5 is a diagram schematically showing inputted image data.

When the image bits are expressed by white and black meshes in an image space, the two-dimensional arrangement of the image data is expressed in a manner as shown in FIG. 5 (black is expressed by hatching for the sake of convenience). Image data shown in FIG. 5 corresponds to the image at the upper left corner of the recording surface 20 shown in FIG. 2. Elements corresponding to those of FIG. 2 are denoted by the same numerals in FIG. 5.

[2] Next, at step S42 in FIG. 4, the positions of the synchronization cells 14 are detected from the image data.

(i) In FIG. 5, paying attention to black cells 14 among the synchronization cells 14, 14, . . . , it is seen that each black cell 14 is separated both from the information recording area 23 and from the other black cells 14 of the synchronization area 13 with interposition of the white meshes, and that the black cell 14 is comprised of a block of connected black image bits in the image data. Therefore, if one black image bit constituting part of a certain black cell 14 can be detected, all the black image bits constituting the black cell can be obtained by examining black image bits connected to the one black image bit.

In practice, by executing scan from the upper left corner of the synchronization area 13 in order of $A_1$ to $A_7$ shown in FIG. 5, the image bit expressed by:

$$DI(x, y)=0$$

is searched. With the above-mentioned operation, firstly one black image bit constituting part of the reference cell 14A is detected.

If a condition prescribing that image bits which are longitudinally and transversely adjacent to a certain image bit are connection image bits (quadruple-adjacency condition) is adopted, image bits connected to the image bit located at the coordinates (x, y) can be expressed as image bits at the coordinates (nx, ny) satisfying the two equations:

$$DI(nx, ny) = DI(x, y)$$

$$(nx, ny) = \{(x-1, y), (x, y-1), (x+1, y), (x, y+1)\}$$

By recurrently searching an image bit satisfying the above condition for a connected image bit found newly, all the black image bits constituting one black cell can be obtained.

Under a condition in which black tends to become blurred, a condition prescribing that image bits which are diagonally adjacent to a certain image bit are also connection image bits (octuple-adjacency condition) is sometimes preferable. In the present case, image bits connected to the image bit located at the coordinates (x, y) are obtained as image bits at the coordinates (nx, ny) satisfying the two equations:

$$DI(nx, ny) = DI(x, y)$$

$$(nx, ny) = \{(x-1, y), (x, y-1), (x+1, y), (x, y+1), (x-1, y-1), (x-1, y+1), (x+1, y-1), (x+1, y+1)\}$$

According to either one of the aforementioned quadruple-adjacency condition or the octuple-adjacency condition, all the black image bits constituting the reference cell 14A are obtained.

(ii) After all the black image bits constituting the reference cell 14A are obtained, the center position (center of gravity) and the width of the reference cell 14A are obtained.

The center position $(C_X, C_Y)$ of a certain black cell can be obtained as a mean of coordinates (Xi, Yi) of the image bits constituting the black cell. That is, assuming that the number of image bits arrayed in each of the transverse and longitudinal directions is "m", the center position can be obtained by:

$$C_X = (1/m) \sum_{i=1}^{m} X_i$$

$$C_Y = (1/m) \sum_{i=1}^{m} Y_i$$

The width W of a certain black cell can be obtained as a square root of the number $M_D$ of all the image bits constituting the black cell. That is, the width W can be obtained by:

$$W = M_D^{1/2}$$

Thus, the center position and the width of the reference cell 14A can be obtained.

(iii) Subsequently, the positions of the black cells 14 aligned with the reference cell 14A in the transverse direction and the longitudinal direction are detected.

Assuming that the center position of the reference cell 14A is $(C_X, C_Y)$ and that the width thereof is W, then it is expected that the center of the black cell 14 next to the reference cell 14A in the rightward direction is located in the position:

$$(C_X + 2W, C_Y)$$

Therefore, by scanning the image data:

$$DI(C_X + 2W + i, C_Y + j)$$

(i and j are integers satisfying $-W/2 \leq i \leq W/2$, $-W/2 \leq j \leq W/2$) in the vicinity of the coordinates of $(C_X + 2W, C_Y)$, one of the image bits constituting the black cell on the right side of the reference cell 14A can be detected even when a deviation or inclination by a maximum of one cell is there. The center position of the black cell can be obtained by the same method as that for the reference cell 14A.

The process of detecting a black cell is repeated in the same manner as described above until the detection of all of a specified number of black cells is completed when the number of black cells 14 aligned in the transverse direction with the reference cell 14A is known, or until no black cell is found transversely rightward when the number of black cells 14 aligned in the transverse direction with the reference cell 14A is not known. With the abovementioned operation, all the black cells 14 arranged in the transverse direction of the reference cell 14A can be found.

Likewise, it is expected that the center of the black cell 14 next to the reference cell 14A in the downward direction is located in the position:

$$(C_X, C_Y + 2W)$$

Therefore, by scanning the image data:

$$DI(C_X + i, C_Y + 2W + j)$$

(i and j are integers satisfying $-W/2 \leq i \leq W/2$, $-W/2 \leq j \leq W/2$) in the vicinity of the coordinates of $(C_X, C_Y + 2W)$, the center position of the black cell 14 on the lower side of the reference cell 14A can be obtained in the same procedure as in the transverse direction. Thus, all the black cells 14 arranged in the longitudinal direction of the reference cell 14A can be found.

(iv) Meanwhile, it is proper to obtain the center position of white cells 14 arranged in the synchronization area 13 by assuming that the center position of each white cell is located between the black cells located on both sides thereof, and mean values of the center coordinates of both the black cells are calculated. When a white cell exists at a terminal end of the synchronization area 13, the position of the white cell located at the terminal end can be obtained by obtaining a regression line from the coordinates of the cells before the terminal end.

According to a simple method, from a black cell position $(x_1, y_1)$ just before the white cell to be obtained and a white cell position $(x_2, y_2)$ before the black cell position, the white cell position at the terminal end is obtained as:

$$(x_1 \times 2 - x_2, y_1 \times 2 - y_2)$$

According to the above-mentioned procedure, the positions of the synchronization cells 14 in the synchronization area 13 are detected without analyzing the information recording area 23.

[3] Then, at step S43 in FIG. 4, the positions of the meshes in the information recording area 23 are determined based on the positions of the detected synchronization cells 14.

Figure 6:
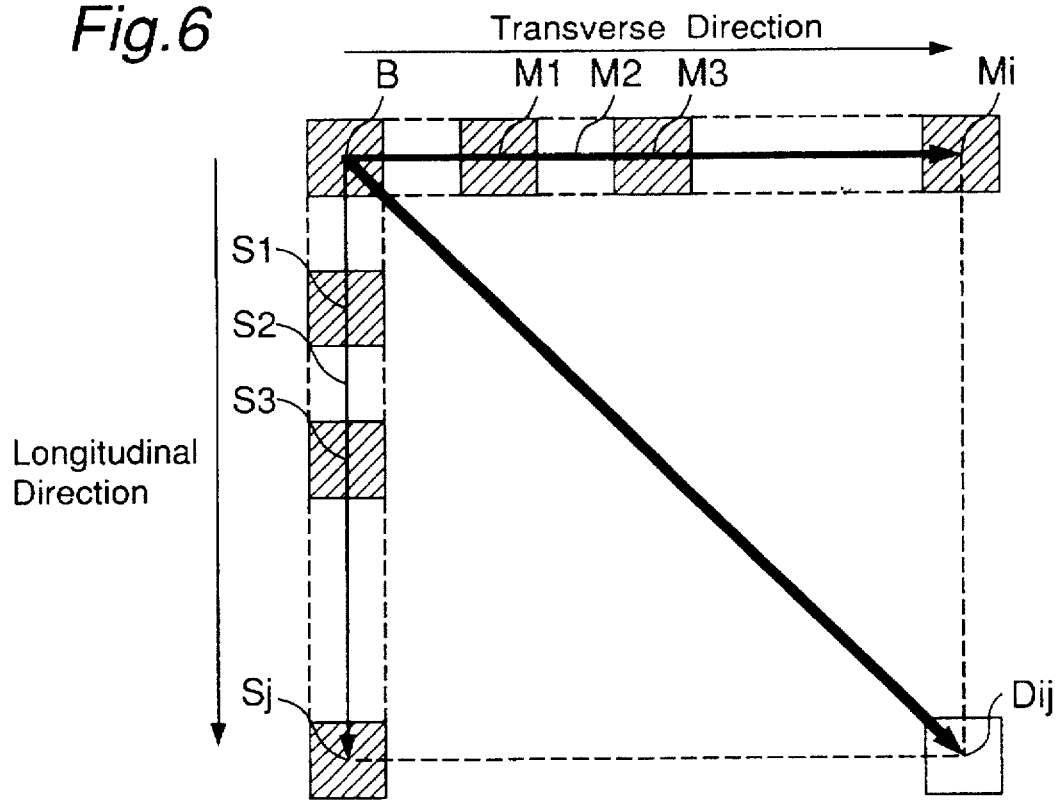
FIG. 6 is an explanatory view of a method for obtaining a calculated center position of each mesh in an information recording area based on the positions of synchronization cells.

As shown in FIG. 6, it is assumed that:

the center coordinates on the image data of the reference cell 14A are expressed by a position vector B, the center coordinates of the synchronization cells 14 arranged in the transverse direction of the reference cell 14A are expressed by a position vector Mi, the center coordinates of the synchronization cells 14 arranged in the longitudinal direction of the reference cell 14A are expressed by a position vector Sj, and the center coordinates of the mesh to be obtained are expressed by a position vector Dij. It is also assumed that the number of meshes in the transverse direction in the information recording area 23 is C, that the number of meshes in the longitudinal direction is L, and that i and j are integers satisfying the expressions of $1 \leq i \leq C$ and $1 \leq j \leq L$.

In the present case, the position vector Dij of the mesh to be obtained is considered to be a vector obtained by adding a vector (Mi-B) and a vector (Sj-B) to the vector B, and then the position vector Dij is obtained by:

$$Dij = B + (Mi - B) + (Sj - B)$$
$$= Mi + Sj - B$$

According to this method, the center position (calculated center position) of each mesh in the information recording area 23 is obtained without being influenced by the possible extension or contraction in the transverse and longitudinal directions of the recording area nor by a deformation of a type expressed by a linear transformation of coordinates.

[4] When the calculated center position of each mesh has been determined, the program flow proceeds to step S44 in FIG. 4 to sample the brightness value of the image bit in the position Dij without scanning the whole image data. Thus, by sampling only the image bit in the calculated center position of each mesh obtained from the synchronization cells 14, the value of each mesh in the information recording area 23 is read at high speed.

(2) Through the aforementioned steps S41 through S44, the value of each mesh in the information recording area 23 can be read. However, when the density of the inputted image data is inappropriate or when a distortion or smear is there, the recorded data is possibly read erroneously.

Therefore, at step S12 in FIG. 1, values of the meshes are extracted every row with each row in the information recording area 23 made to serve as an unit, and the parity bit (i.e., error detection code) provided at the right end of every row is examined to decide whether a read error is present or absent in the row (S13). When no read error is present, the reading of the row ends. When a read error is present, the reading of the row is executed again by an analyzing method as described later which has not been implemented (S14). Subsequently, the error detection code is examined again to decide whether a read error is present or absent in the row (S15). When no read error is present, the reading of the row ends. When a read error is present, it is decided whether or not a further analyzing method which has not been implemented is available (S17). When a further analyzing method which has not been implemented is not remaining, the reading of the row ends. When a further analyzing method which has not been implemented is remaining, the program flow returns to step S14 to execute again the reading of the row by the analyzing method which has not been implemented. In this way, when a read error is present, the reading of the row is repeated until after all the available analyzing methods are carried out.

For analyzing the image data in a row in which a read error is detected, the following three analyzing methods <1> through <3> can be adopted.

<1> A first analyzing method is a method in which an image bit located in a position different from the previously calculated center position is sampled by shifting the sampling position by a specified amount within a dimension of every mesh.

Figure 7A:
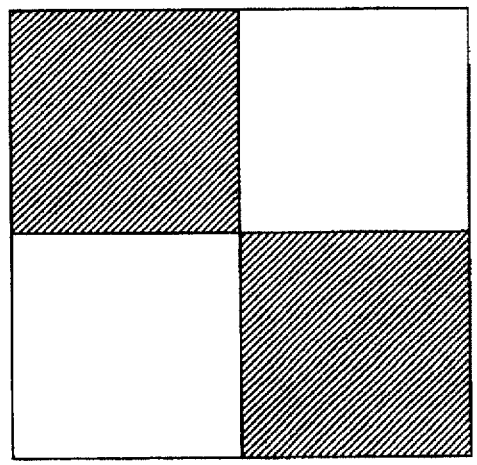
FIG. 7A is a view of an example of image data in which noise is not included.
Figure 7B:
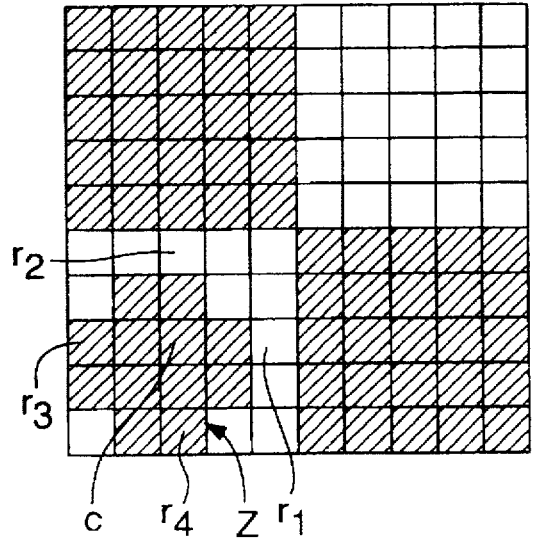
FIG. 7B is a view showing that noise is included in the image data of FIG. 7A.

For example, assume that an image data corresponding to four meshes shown in FIG. 7A includes noise as shown in FIG. 7B. As shown in FIG. 7B, a black noise Z exists in the white mesh located in the lower left position. In the present case, if the image bit in the center position c of the white mesh located in the lower left position is sampled to evaluate the brightness value, the white mesh is erroneously read as a black mesh.

Therefore, when the read error is detected, the value of a different image bit is sampled by shifting the sampling position within the size of each mesh. The image data of each mesh includes a plurality of image bits (i.e., dots). Therefore, by sampling an image bit in a varied position, there is a possibility of reading the correct value. In the case shown in FIG. 7B, it is found through analysis of the synchronization cells 14 that the mesh size corresponds to longitudinal 5 image bits×transverse 5 image bits. Therefore, on all the meshes in the row in which the read error is detected, an image bit $r_2$, $r_4$, $r_3$ or $r_1$, in the position shifted by two image bits to the upper, lower, left or right side from the center c of a mesh, is sampled. In the present example, the correct value can be read in the positions of $r_1$ and $r_2$.

<2> A second analyzing method is a method in which a sum s of weighted values of image bits included in each mesh in the row is calculated and then the sum is compared with a predetermined threshold value t to determine the value (1 or 0) of the mesh.

For instance, it is assumed that, as the result of excessively high density of the image data corresponding to the four meshes shown in FIG. 8A, the white meshes become totally blackish as shown in FIG. 8B. As shown in FIG. 8B, white image bits and black image bits exist at random in the white meshes located in the lower left and upper right positions. In the present case, if the image bit in the center position c of the white mesh located in the lower left position is sampled to evaluate the brightness value, the white mesh is erroneously read as a black mesh. In such a case, since the image data is totally blackish, it is possible that the aforementioned method of shifting the sampling point (the first analyzing method <1>) may produce no effect.

Therefore, when a read error is detected, by using not only the image bit in the center position c of a certain mesh but also its surrounding image bits $r_1$, $r_2$, . . . , $r_8$ as shown in FIG. 9A, a sum of the weighted values of those image bits is calculated. That is, the weights shown in FIG. 9B are given to the nine image bits c, $r_1$, $r_2$, . . . , $r_8$, and the sum s is calculated as follows:

$$s = r_1 + r_3 + r_6 + r_8 + (r_2 + r_4 + r_5 + r_7) \times 2 + c \times 3.$$

When the sum s is not smaller than the specified threshold value t, the mesh is evaluated to be a white mesh (value 1). Otherwise, the mesh is evaluated to be a black mesh (value 0). Thus, by summing a plurality of image bits to make the image data have substantially a gradation, the value of the mesh can be read correctly.

An average of the sums of weighted values of all combinations of the white and black image bits is 8. Therefore, when the density of the image data is excessively high, the threshold value t is properly set to a value larger than 8. When the density of the image data is excessively low, the threshold value t is properly set to a value larger than 8. With the above-mentioned arrangement, the value of each mesh can be read correctly.

<3> In a third analyzing method, a boundary of a certain mesh in the row in which a read error is detected is recognized, and based on a distance between the recognized boundary of the mesh and the center position (calculated center position) of the mesh obtained from the synchronization cells 14, an error between the calculated center position and the true i.e. actual center position is obtained. Based on the obtained error, a correction is effected so that a calculated center position of a mesh adjacent to the above-mentioned mesh coincides with a true center position.

Figure 10A:
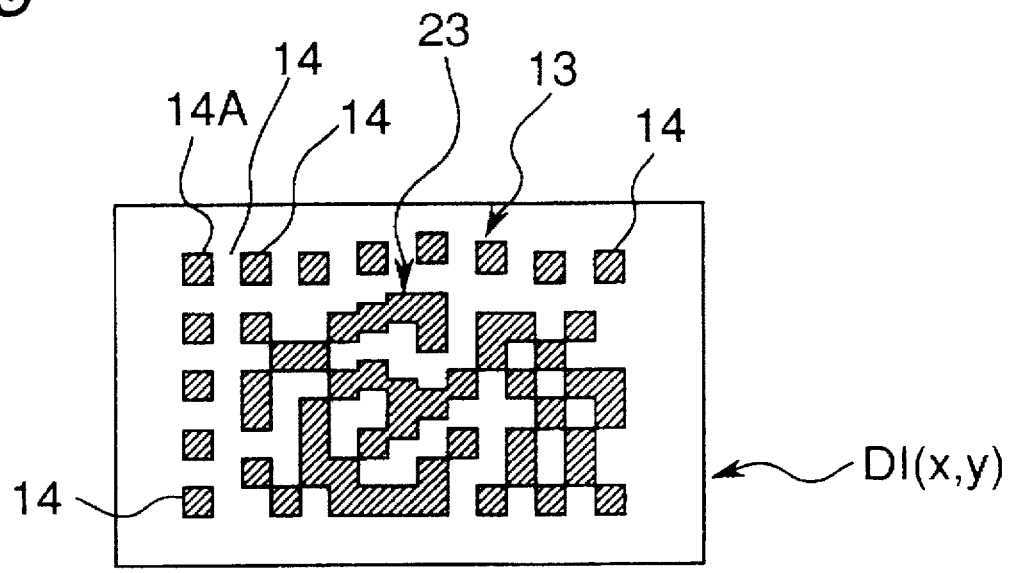
FIG. 10A is a view of an example of input image data as partially distorted upward.
Figure 10B:
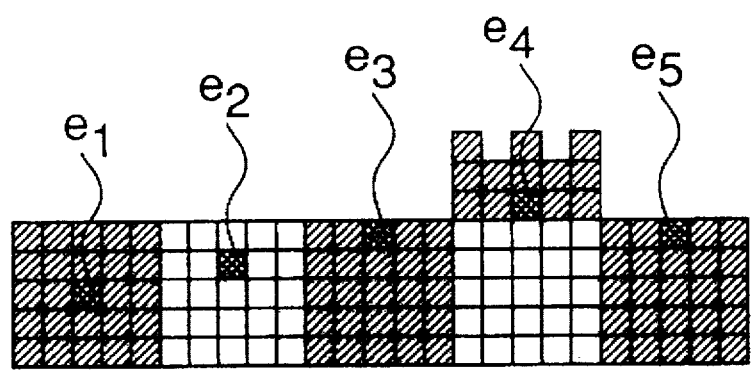
FIG. 10B is a view for showing center positions displaced upward.

For example, as shown in FIG. 10A, it is assumed that image data DI(x, y) is inputted as partially distorted upward. In the present case, as shown in FIG. 10B, $e_2, e_3, \ldots, e_5$ of the calculated center positions (indicated by cross-hatching) are displaced upward from the true center positions, where an extreme one $e_4$ possibly indicates the upwardly adjacent mesh. In the present example, the proper mesh that $e_4$ should indicate is the white. However, the upwardly adjacent mesh is the black, and therefore a read error occurs.

Therefore, when a read error is detected, the boundary of each mesh is detected on the row in which the read error is detected. Based on the distance between the detected boundary of the mesh and the calculated center position of the mesh, the error between the calculated center position and the true center position is obtained. Then, based on the obtained error, a correction is effected so that the calculated center position of a mesh to be read subsequently coincides with the true center position. With the above-mentioned operation, a more accurate positioning can be achieved to allow the value of the mesh to be read correctly.

Figure 11:
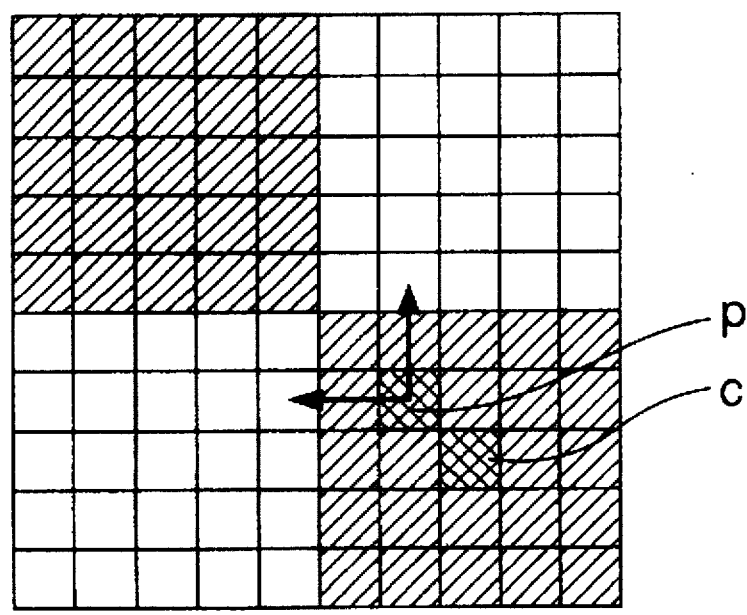
FIG. 11 is an explanatory view of a method for correcting a calculated center position.

For example, it is postulated that the dimension W of a mesh of an image data shown in FIG. 11 is preparatorily found to be longitudinal 5 image bits×transverse 5 image bits through analysis of the synchronization cells 14. In regard to the black mesh located in the lower right position among the four meshes, it is assumed that the calculated center position is located in an image bit p. By examining the image bits in the vicinity of p, white image bits are detected each at an interval of two image bits in the upward and leftward directions. Therefore, an error between the image bit p in the calculated center position of the mesh and the image bit c in the true center position (the error corresponds to a displacement of one image bit leftward and one image bit upward) can be known. Based on the error, the mesh to be read subsequently (a mesh (not shown) on the right of the above-mentioned black mesh in the present example) is subjected to a correction such that the position of the image bit to be sampled is shifted rightward by one image bit and downward by one image bit. Consequently, the image bit located in the center position within the adjacent mesh can be correctly sampled.

Figure 12:
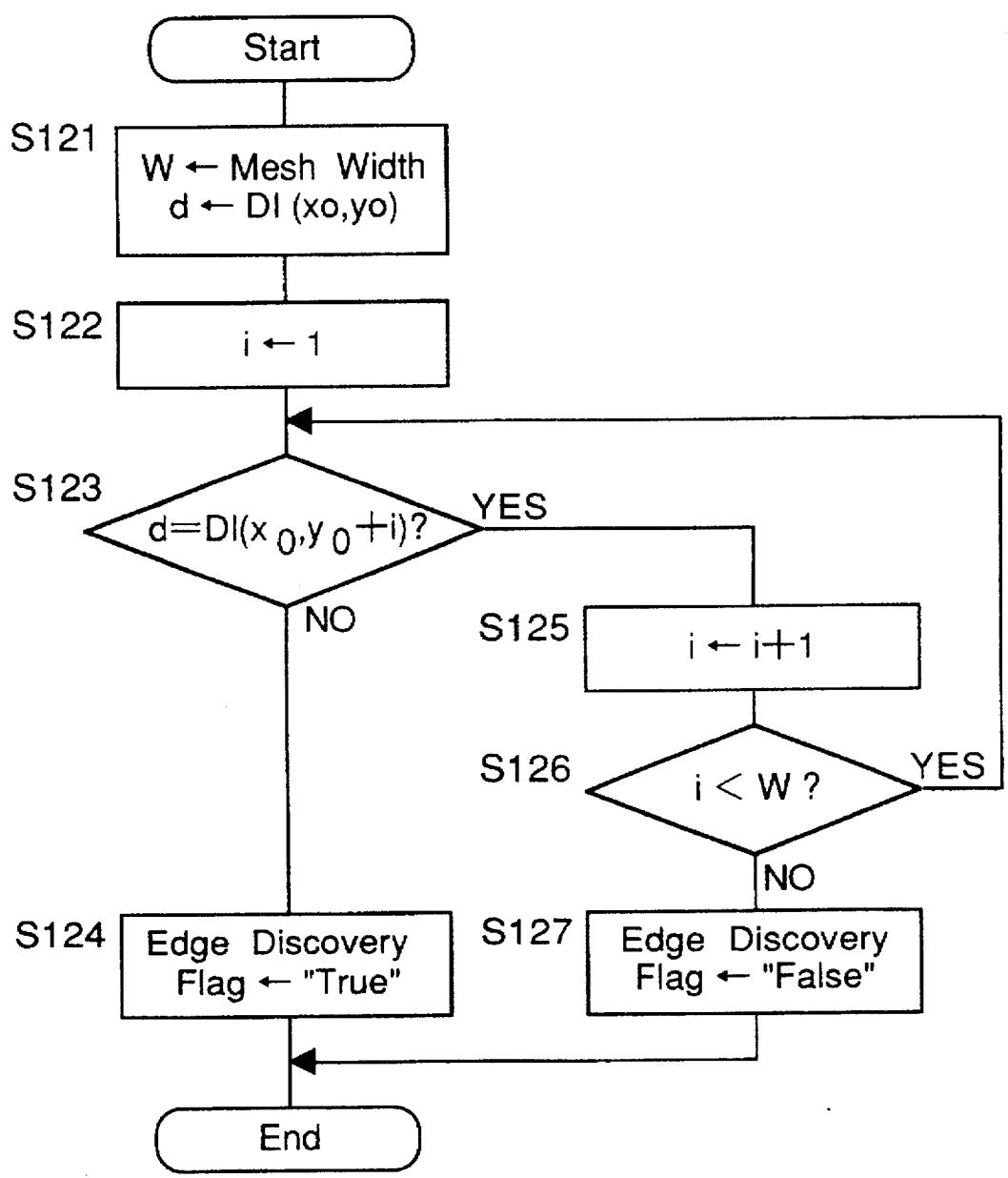
FIG. 12 is a flow chart showing a flow of detecting a boundary between meshes according to a third analyzing method.

FIG. 12 shows a process for detecting the mesh boundary according to the analyzing method <3>.

When the downside boundary of a certain mesh is obtained, firstly it is assumed that the dimension (width) of the mesh is W and a value $DI(x_0, y_0)$ of an image bit located in the calculated center position $(x_0, y_0)$ of the mesh is d (S121). Further, i is defined as an amount of shift for searching the image bit. First, in order to examine the value of an adjacent image bit, 1 is set to i (S122), and the value d of the image bit located in the calculated center position $(x_0, y_0)$ is compared with a value $DI(x_0, y_0+i)$ of an image bit located in the position shifted downward by i therefrom (S123). When the compared two values are different from each other, it is decided that the downside boundary of the mesh has been detected, and then an edge discovery flag is made to be "true" to end the detection process (S124). In the above stage, the value set to i corresponds to the distance between the calculated center position $(x_0, y_0)$ and the boundary of the mesh.

When the compared two values are identical at step S123, the value of i is incremented by one in order to search a further downward adjacent image bit (S125), and then the value of i is compared with the width W of the mesh (S126). When the value of i is smaller than the width W of the mesh, it is decided that the position $(x_0, y_0+i)$ is still within the above mentioned mesh. Then the program flow returns to step S123 to compare the two values of d and $DI(x_0, y_0+i)$ with each other. Thus, so long as the value of i is smaller than the width W of the mesh and the shifted position $(x_0, y_0+i)$ is still within the above-mentioned mesh, the comparison of the value of d with the value of $DI(x_0, y_0+i)$ is repeated to detect the boundary. When the value of i becomes not smaller than the width W of the mesh, it is decided that no boundary exists below the mesh, i.e., the value of the mesh under examination is identical to the value of the downward adjacent mesh, and the edge discovery flag is made to be "false" to end the detection process (S127).

When the upside boundary of the above-mentioned mesh is obtained, the value d of the image bit located in the calculated center position $(x_0, y_0)$ is compared with a value $DI(x_0, y_0-i)$ of an image bit located in the position shifted upward by i therefrom at step S123. The other processes are the same as in obtaining the downside boundary.

When the left-hand boundary of the above-mentioned mesh is obtained, the value d of the image bit located in the calculated center position $(x_0, y_0)$ is compared with a value $DI(x_0-i, y_0)$ of an image bit located in the position shifted leftward by i therefrom at step S123. The other processes are the same as in obtaining the upside boundary.

When the right-hand boundary of the above-mentioned mesh is obtained, the value d of the image bit located in the calculated center position $(x_0, y_0)$ is compared with a value $DI(x_0+i, y_0)$ of an image bit located in the position shifted rightward by i therefrom at step S123. The other processes are the same as in obtaining the upside boundary.

In a manner as described above, the upside, downside, left-hand and right-hand boundaries of the mesh are detected.

When the upside and downside boundaries of a certain mesh have been detected, assuming that the distances from the calculated center position $(x_0, y_0)$ of the mesh to the upside boundary and the downside boundary are $i_1$ and $i_2$ respectively, it can be recognized that the calculated center position $(x_0, y_0)$ of the mesh is displaced upward from the true center position by the amount corresponding to the number of image bits:

$$(i_2-i_1)/2$$

Therefore, the calculated center position of the mesh to be read subsequently is corrected downward by the above amount.

When only one of the upside boundary and the downside boundary is detected for a certain mesh, assuming that a distance from the calculated center position $(x_0, y_0)$ of the mesh to its boundary is $i_3$, it can be recognized that the calculated center position $(x_0, y_0)$ of the mesh is displaced from the true center position to the side of the boundary by the amount of image bits:

$$W/2-i_3+0.5$$

Therefore, the calculated center position of the mesh to be read subsequently is corrected to the side opposite from the boundary by the above amount.

Likewise, in the transverse direction, a correction can be effected so that the calculated center position of the mesh to be read subsequently coincides with the true center position.

When, on all of the upside, downside, left-hand side and right-hand sides of a mesh of which a boundary is to be detected, there exists a mesh having the same value as that of the above-mentioned mesh, no boundaries are detected, which means that the third analyzing method cannot be applied. In such a case, in the stage in which digital information is recorded in the information recording area, a processing for preventing the white meshes or black meshes from continuing is preparatorily effected. For instance, by making meshes in the two-dimensional pattern (primary pattern) to be properly recorded correspond with meshes in a checkered modulation pattern one to one, calculating the exclusive OR of values expressed by the corresponding meshes, forming a secondary pattern of white meshes and black meshes expressing the values of the exclusive OR, and expressing the secondary pattern in the information recording area 23. In the secondary pattern, the white meshes and the black meshes hardly continue, meaning that they are dispersed. Therefore, the boundaries of each mesh can be easily detected.

It is to be noted that the aforementioned first through third analyzing methods can be applied in appropriate combinations for each line according to the state of the image data. Further, when a read error does not disappear as the result of applying one analyzing method out of the first through third analyzing methods throughout a plurality of rows, other analyzing methods can be applied to the plurality of rows.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital information decoding method for reading digital information from a recording carrier on which, by virtually setting matrix meshes corresponding to bits on a flat recording surface of the recording carrier and by giving an optically recognizable mark to each of the meshes, the digital information is recorded as a two-dimensional pattern together with a positioning mark for indicating position of each of the meshes and an error detection code for detecting a read error, comprising the steps of:

(a) converting the two-dimensional pattern recorded on the recording surface into image data composed of image bits having a density higher than density of the meshes;

(b) calculating a center position of each of the meshes of the image data based on the positioning mark;

(c) examining only a value of an image bit located in the calculated center position in the image data;

(d) reading a value of the image bit examined at step (c) as a value of the mesh;

(e) deciding whether or not a read error is in the values of the read meshes by examining the error detection code; and (f) re-reading the values of the meshes by executing, instead of a first analyzing method comprising the steps (b) to (d), a second analyzing method, when a read error is in the value of the read meshes.

2. A digital information decoding method according to claim 1, wherein an information recording area of the recording carrier has a plurality of regions each of which is provided with the error detection code, and wherein steps (b) to (f) are executed for each region.

3. A digital information decoding method according to claim 1, wherein said second analyzing method comprises the steps of:

examining a value of an image bit located in a position shifted by a specified amount from the calculated center position within dimensions of the mesh; and reading the value of the image bit as a value of the mesh.

4. A digital information decoding method according to claim 1, wherein said second analyzing method comprises the steps of:

calculating a sum of weighted values of a plurality of image bits included in each mesh;

comparing the sum with a specified threshold value; and determining the value of the mesh based on a result of the comparison.

5. A digital information decoding method according to claim 1, wherein said second analyzing method comprises the steps of:

recognizing a boundary of a mesh being examined;

correcting a calculated center position of a mesh adjacent to the mesh being examined based on a distance between the recognized boundary and the calculated center position of the mesh being examined such that the calculated center position of the adjacent mesh coincides with an actual center position thereof; and reading a value of the image bit located in the corrected calculated center position as a value of the adjacent mesh.

* * * * *